(No Model.) 2 Sheets—Sheet 1.
D. F. LONG & B. F. SHULL.
COMBINED CHILD'S WAGON AND VELOCIPEDE.

No. 564,796. Patented July 28, 1896.

Witnesses,
James L. Butler.
C. E. Humphrey

Inventors,
David F. Long:
Benjamin F. Shull:
By C. E. Humphrey Atty.

(No Model.) 2 Sheets—Sheet 2.
D. F. LONG & B. F. SHULL.
COMBINED CHILD'S WAGON AND VELOCIPEDE.
No. 564,796. Patented July 28, 1896.
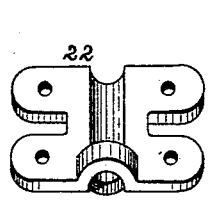
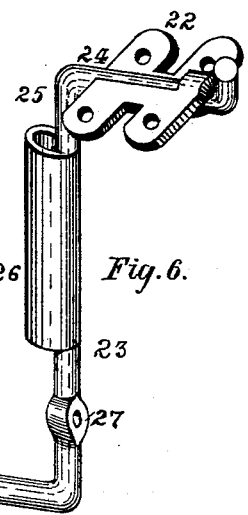
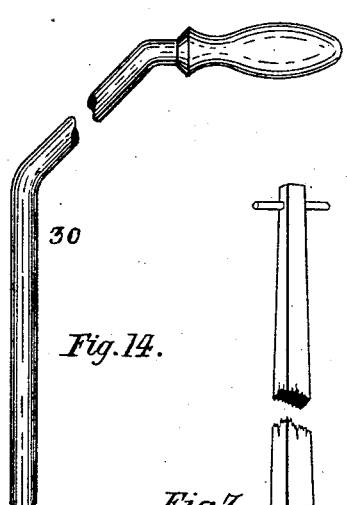
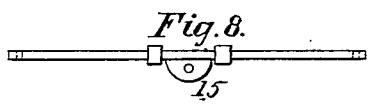
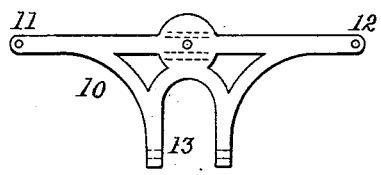
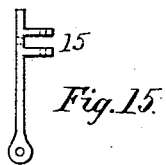
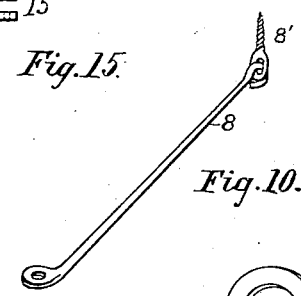
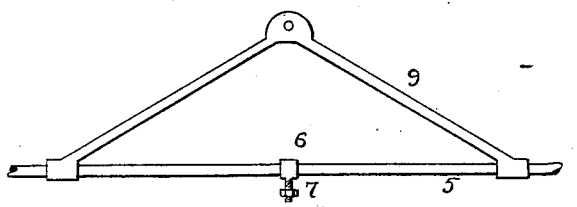
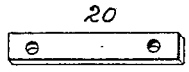
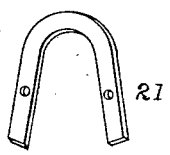
Witnesses,
James L. Butter
C. E. Humphrey
Inventors,
David F. Long:
Benjamin F. Shull:
By C. R. Humphrey Atty.

UNITED STATES PATENT OFFICE.

DAVID F. LONG AND BENJAMIN F. SHULL, OF CANTON, OHIO; SAID SHULL ASSIGNOR TO SAID LONG.

COMBINED CHILD'S WAGON AND VELOCIPEDE.

SPECIFICATION forming part of Letters Patent No. 564,796, dated July 28, 1896.

Application filed February 7, 1896. Serial No. 578,357. (No model.)

*To all whom it may concern:*

Be it known that we, DAVID F. LONG and BENJAMIN F. SHULL, citizens of the United States, residing at Canton, in the county of Stark and State of Ohio, have invented a certain new and useful Improvement in a Combined Child's Wagon and Velocipede, of which the following is a specification.

Our invention has relation to improvements in wagons for the use of children, in which by a slight change of parts it may be utilized as a velocipede and adapted to be driven by hand or foot power, or both.

The objects of our invention are to produce a strong serviceable wagon, in which, when desired, the interior of the box may be free and clear of all obstructions, and when used as a velocipede either foot or hand power, or both, can be used advantageously, and, finally, to provide a new and improved running and steering gear for the front pair of wheels.

To the aforesaid objects our invention consists in the peculiar and novel construction, combination, and arrangement of the various parts hereinafter described, and then specifically claimed, reference being had to the accompanying drawings, forming a part of this specification.

Figure 1:
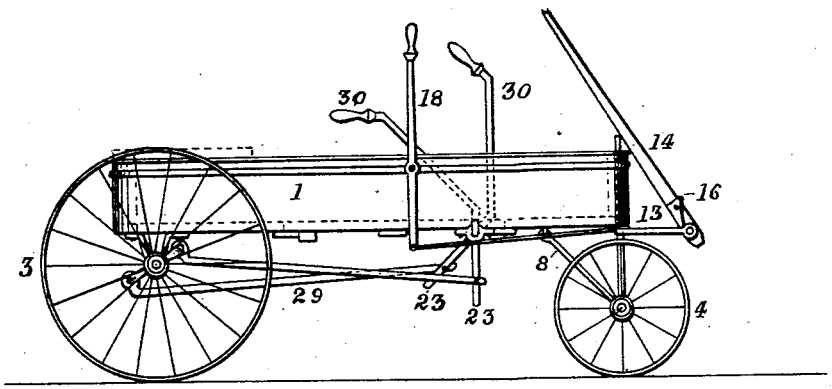
Figure 2:
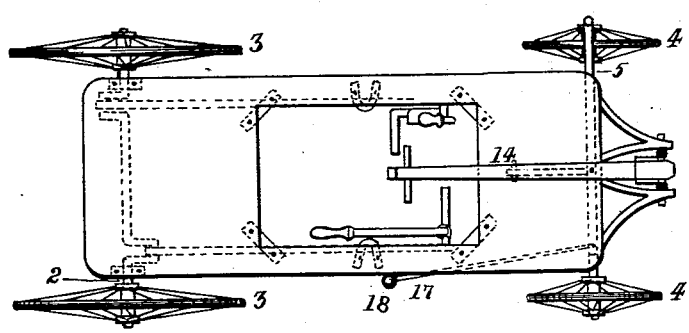
Figure 3:
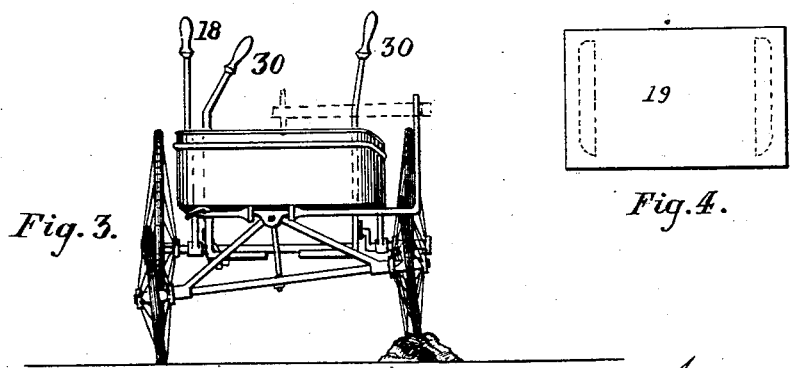
Figure 4:
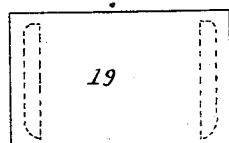

In the accompanying drawings, in which similar reference-numerals indicate like parts in the different views, Figure 1 is a side elevation of our invention; Fig. 2, a plan thereof; Fig. 3, a front elevation. Figs. 4, 5, 6, 7, 8, 9, 10, 11, 12, 13, 14, and 15 are details of the various parts to be more fully described.

In the drawings, 1 is a wagon-box mounted at the rear end on an axle 2, containing a double crank, bearing two large wheels 3. The front of this box 1 is supported by a pair of smaller wheels 4 on an axle 5, on the center of which is a collar 6, terminating in a downwardly-pointed stud 7, Fig. 11, screw-threaded for a nut. On this stud 7, and retained by the nut, is the eye of a brace 8, Fig. 10, on the other end of which is a screw-eye 8', which is fastened into the under side of the floor of the box 1, and serves to prevent backward and forward motion of the axle 5. Above this axle 5 is a V-shaped brace, inverted, 9, terminating in two sleeves to inclose the axle 5 just within the hubs of wheels 4, and serving as collars for said wheels. The upper end is flattened and pierced centrally to receive a bolt. Above this brace 9 is the turn-table or fifth-wheel of the wagon, consisting of a frame 10, Figs. 8, 9, and 15, having two side cross-arms 11 and 12, perforated, and a pair of parallel forward arms 13, perforated to receive the tongue 14, Fig. 7.

The upper face of frame 10 (see Fig. 9) has a smooth circular enlarged center portion and perforated to receive the king-bolt. On the under side of this frame are two ears 15, parallel to arms 11 and 12 and on each side of the central perforation. The ears inclose the flat part of brace 9, and it is held there by a bolt.

Before the frame 10 and brace 9 are fastened together the king-bolt, the threaded end first, is passed through the hole in frame 10 from below between the ears 15, leaving the threaded end projecting upward and the head thereof secured against revolution by the ears 15 and held from dropping out from any cause by the placing of the flat part of brace 9 between the ears 15. The bottom of the wagon-box 1 is pierced to receive this king-bolt, and on the under side of the box surrounding the bolt-hole is a plate or washer, flat and smooth and of the same diameter as the circular part of frame 10. The king-bolt passes through this washer, through the floor of the box 1, and is held by a nut. The tongue 14 is normally held upright by a spring 16, pressing against the fork 13. It is also pierced transversely near its lower end, for a purpose to be described.

The steering-gear is as follows: A connecting-rod 17 is connected at one end to the end 11 of frame 10 and at the other end to the lower end of a lever 18, pivoted on the outside of box 1, and by means of which the frame 10, shaft 5, and wheels 4 are directed at the will of the operator. We also use a slightly-different arrangement when desired, leaving out rod 17 and hand-lever 18 entirely and prolonging end 12 of frame 10 beyond the side of box 1, and then (it being cylindrical from this point to its free end) it is bent to a vertical position, its end extending slightly above the box 1. Then the tongue is removed from its place and the upright shaft just described is inserted in the hole in the end of the tongue, and by this means the forward wheels are controlled.

Near the center of the bottom of the box 1 there is cut an elongated opening with straight sides. This is closed when desired by a board 19, which fits in said opening and is supported as follows: Diagonally across the corners of this opening on the under side of the box are fastened short straps of iron 20, Fig. 12, so as to extend into and partially close the opening, and upon the upper faces of these straps rests the board or lid 19. In order to strengthen these supports, there are a pair of horseshoe-shaped plates 21, Fig. 13, fastened like plates 20 to the under side of the box with their rounded ends projecting into the opening. Near the front end of this opening on the under side of the box 1 are fastened journal-boxes 22, Figs. 5 and 6. In these boxes are journaled and supported a pair of pedal-cranks 23, each of which has a horizontal part 24, held in the box, a vertical part 25, bearing a cylindrical socket 26, open at both ends. Below this is an eye 27, below which the crank is bent at right angles to the vertical part, forming a pedal 28. Connecting-webs 29 extend between the cranks on shaft 2 to the eyes 27, and through which motion is communicated from the pedals to the rear axle 2. Now, in order to aid the power of the operator's feet on the pedals, there are two hand-levers 30, Fig. 14, which are of round iron with handles and bent to a preferred shape, and which are inserted into sockets 25 on the cranks. Thus the operator may use both hands and feet, or either, to propel the wagon.

When the wagon is used as a velocipede, the board 19 is placed across the top of the box, as indicated in dotted lines in Fig. 1, and is retained in place by the cleats shown in dotted lines. When used as a wagon, the board is placed in the opening in the floor of the box, completely filling it, and the handles being previously removed the floor of the box presents a smooth surface, free from mechanism of any kind.

The reason of hinging the brace 9 into the ears 15 is to allow a partial tilt of the front axle without disturbing the position of the box 1, as shown in Fig. 3.

What we claim is—

1. The combination in a convertible child's wagon of a wagon-box, a rear axle bearing oppositely-disposed cranks, a pair of connecting-rods, a pair of foot-cranks hinged to said box and connected by said rods to said axles cranks, a pair of sockets with suitable handles therefor on said second-named cranks, a front axle mounted on an upright, inverted V-shaped frame, a horizontal frame hinged to said first-named frame, and attached by a vertical bolt to said box, all constructed and arranged substantially as shown and described.

2. The combination in a wagon of the class designated of a wagon-box mounted on a pair of axles on wheels, an opening in the bottom of said box, a lid to close said opening, a number of straps adapted to diagonally cross the corners of said opening on the under side of said box and support said lid, with a pair of foot-cranks hinged to said box and underneath thereof, a pair of sockets integral with said cranks and arranged to receive hand-levers, and a pair of connecting-rods, attached to a pair of cranks on the rear axle of said wagon, substantially as shown and described.

3. The combination in a wagon of the class designated of a wagon-box mounted on axles on wheels, said box having an opening in the bottom thereof, a lid to close said opening, a number of straps adapted to be fastened to the under side of said box and project into the opening thereof and sustain said lid, of a pair of skeleton frames hinged together, one attached to the front axle of the wagon and upright, the other horizontal and pivotally attached to the under side of said box, a horizontal longitudinal bolt uniting said frames and a king-bolt uniting the second frame to said wagon-box, with a steering hand-lever pivoted to said box, and a connecting-rod uniting said lever and last-named frame, and arranged to control the motion of said front axle, substantially as shown and described.

4. In a wagon of the class designated, the combination of a wagon-box suitably mounted, an opening in the floor thereof provided with devices for sustaining a lid thereto, a lid adapted to close said opening, and provided with cleats adapted to retain it in place when used as a seat across the sides of box, of a pair of crank-pedals hinged to the under side of said box on either side of said opening, a pair of sockets integral with said cranks, hand-levers adapted to enter the sockets upon the cranks connecting-rods attached to said pedal-cranks and to cranks on the rear axle of said wagon, substantially as shown and described.

In testimony that we claim the above we hereunto set our hands.

DAVID F. LONG.
BENJAMIN F. SHULL.

In presence of—
  J. C. BOTHWELL,
  NATHAN HALLOWAY.